Sept. 6, 1949.  A. F. DANIEL  2,480,839
ALKALINE PRIMARY CELL
Filed Dec. 3, 1945

INVENTOR.
ARTHUR F. DANIEL
BY
William D. Hall
Attorney

Patented Sept. 6, 1949

2,480,839

UNITED STATES PATENT OFFICE 2,480,839

ALKALINE PRIMARY CELL

Arthur F. Daniel, Fair Haven, N. J., assignor to the United States of America as represented by the Secretary of War Application December 3, 1945, Serial No. 632,586

4 Claims. (Cl. 136—107)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to primary electric cells.

One of the objects of the invention is to provide a primary cell having a high capacity per unit weight and per unit volume.

Another object of the invention is to provide a cell having a good low temperature characteristic.

A further object is to provide a cell having low internal resistance and therefore capable of a relatively high short circuit current.

A still further object is to provide a cell having improved internal insulation and therefore a longer shelf life.

Another object is to provide a cell adapted to physically and electrically replace the usual dry cell and having corresponding terminal polarities.

The invention also provides a cell which can be made at a lower cost than previous cells which are comparable to it.

Other objects will be appreciated by those skilled in the art.

My present invention attains the mentioned objects by the arrangement of the elements of the cell hereinafter described and claimed. This arrangement provides a comparatively large exposed surface area of the elements, which is one of the factors giving the improved results, such as high capacity per unit weight and volume, good low temperature characteristics and low internal resistance, etc. Another factor is the use of a novel type of anode, comprising a porous, electrolyte-absorbent body of anodic metal particles, preferably zinc, which allows the construction of a cell according to my present invention.

The new cell includes a series of concentric porous elements, in the form of cups and cylinders, including preferably the novel type of electrolyte-absorbent anode mentioned above, which provides a chemically active area many times that afforded by other types of anode, whereby the cell is capable of a high current drain. The cell also comprises an oxidizing cathode and a layer or filling of inert, electrolyte-absorbent material between the electrodes. The cell also preferably includes a porous barrier or separator to prevent the deleterious transfer of material from one electrode to the other. Additional elements and features of the improved cell will be described below.

The drawings illustrate one form of the novel primary dry cell.

Figure 1:
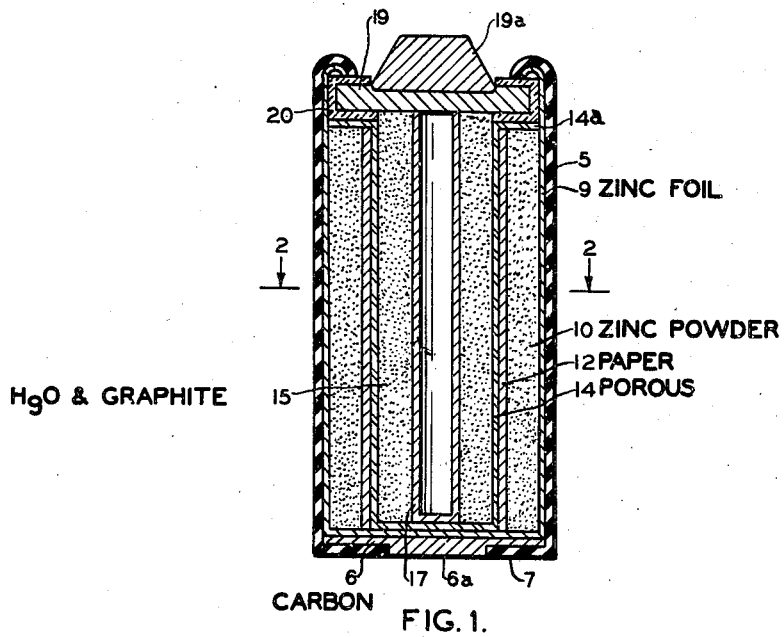
Figure 1 shows the cell in central vertical section.
Figure 2:
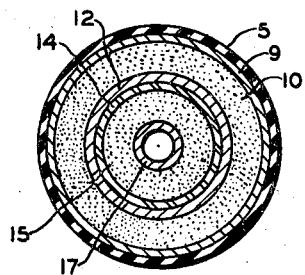
Figure 2 is a sectional view taken on line 2—2 of Figure 1 in the direction indicated.

Referring to the drawings for a more detailed description thereof, the numeral 5 indicates the container or casing of the cell. The container may be of any suitable material, being herein shown as of a synthetic plastic. A metallic plate 6 lies on the bottom 7 of the container and has a depending button 6a extending through a central aperture formed in the bottom 7 to constitute one of the terminals of the cell.

The inner wall of the container is lined with zinc foil 9 and this foil also covers the metal plate 6, thus forming a solid zinc cup. The foil prevents the electrolyte from contacting the container and also functions as a low resistance element between the anode and the terminal plate 6.

Within and contacting the zinc foil is a porous, electrolyte-absorbent zinc anode 10 in the form of a hollow cylinder. This anode is of zinc powder or particles, preferably compressed under sufficient pressure to agglomerate the particles into a coherent body. This new type of anode is sufficiently porous to absorb the electrolyte and therefore has a very large interstitial area in contact with the electrolyte. Consequently, this anode has a low resistance, and a very large active surface which allows a high current drain, and has other advantages.

A cylindrical layer of porous paper or other electrolyte-absorbent material 12 is disposed within and contacts the anode 10. This element may be omitted in certain types of cells. A barrier or separator 14, in the form of a cup, is positioned within, and is in contact with the element 12 and acts to prevent the transfer of material from one electrode to the other, which transfer adversely affects the operation of the cell. Said barrier or separator is also porous and may be made of any electrolyte-permeable material such as parchment paper or polyvinyl alcohol, etc., as known in the art. The barrier 14 has a flange 14a at its upper end extending outwardly over the upper edges of elements 10 and 12 to effectively perform its mentioned function.

A depolarizing or oxidizing cathode 15, cylindrical in form, is disposed interiorly of the barrer 14 and is in contact therewith, and may be, for example, a compressed mixture of mercuric oxide with graphite. Such mixture of the mentioned materials, in comminuted form, is subjected to a pressure sufficiently high to form a unitary mass or body.

A hollow, cylindrical, porous, carbon cup 17, is at the center of the cell, contacting the cathode 15, and is intended to receive the electrolyte, which filters through its wall and thereafter successively through the cathode 15, the barrier 14, the absorbent material 12 and the anode 10.

A metallic cover 19 is provided for the cell and serves as one of its terminals, contacting, as it does, the upper ends of the cathode 15 and the carbon cup 17, and having a button 19a which extends above the container 5 to conveniently contact a conductor. The cover 19 is preferably made of a metal which is inert to the alkaline electrolyte, so that it will not be reactive in the cell, as iron for example. The button 19a may be of the same material as the cover 19.

The cover 19 is insulated from the zinc foil 9 by a channeled grommet 20, which receives the peripheral portion of the cover. As shown, the upper edge of the container is bent inwardly and downwardly onto the grommet, and pressed down on the same, so that the cover is held in contact with the cathode and the carbon cup 17.

The composition of the electrolyte for this type of cell is known, being an aqueous solution of an alkali hydroxide, substantially saturated with a zinc oxide when the anode is zinc. For convenience, it is stated here that the electrolyte may be made by dissolving 75 grams of potassium hydroxide in 100 grams of water, to which solution 12 grams of zinc oxide are added and dissolved therein. This electrolyte is introduced into the cell by pouring it into the porous carbon cup 17, as stated above, and, obviously, before the cover 19 is placed in position.

What is claimed is:

1. In a cylindrical dry cell: a central, porous, electrically conductive, hollow cup of electrochemically inert material adapted to be filled with electrolyte and to allow the same to permeate its wall; a depolarizing, porous cathode around the porous, hollow cup; a porous barrier, in cup form, around the cathode; a porous, non-conducting, non-metallic, electrolyte-absorbent material around the barrier; a zinc anode around the electrolyte-absorbent material, the anode being a porous body of agglomerated zinc particles adapted to absorb electrolyte; a solid zinc cup around the porous zinc anode; and a casing around the zinc cup.

2. In a primary cell: a container, a solid layer of zinc lining the inner surface of the container; a porous, zinc anode within and contacting the layer of zinc, the anode being a body of agglomerated zinc particles adapted to absorb electrolyte; a porous cylinder of non-conducting, non-metallic, electrolyte-absorbing material within and contacting the anode; a porous, barrier cup within and contacting the non-metallic, electrolyte-absorbent material; a depolarizing cathode within and contacting the barrier cup of electrochemically inert material; and an electrically conductive porous cup within and contacting the cathode and adapted to receive electrolyte and to allow the same to permeate through the wall thereof.

3. In a primary cell: a container; a solid layer of zinc lining the inner surface of the container; a porous zinc anode within and contacting the layer of zinc, the anode being a body of agglomerated zinc particles adapted to absorb electrolyte; a porous cylinder of non-conducting, non-metallic, electrolyte-absorbent material within and contacting the non-metallic, electrolyte-absorbent material; a depolarizing cathode within and contacting the barrier cup of electro-chemically inert material; a porous, electrically conductive cup within and contacting the cathode and adapted to receive electrolyte and to allow the same to permeate through the wall thereof; the container being of insulating material and having an aperture in its bottom; and a conducting element contacting the mentioned zinc lining and resting on the inner surface of the container bottom and having a depending button extending through the aperture and functioning as a terminal for the cell.

4. In a cylindrical dry cell: a central, porous, electrically conductive cup of electro-chemically inert material adapted to be filled with electrolyte and to allow the same to permeate its wall; a depolarizing porous cathode around the central, porous cup; a porous barrier around the cathode; a porous, non-conducting, non-metallic, electrolyte-absorbent material around the barrier; and a porous zinc anode around the electrolyte-absorbent material, said anode being a single body of coherent zinc particles.

ARTHUR F. DANIEL.

REFERENCES CITED

The following references are of record in the file of this patent:

UNITED STATES PATENTS

| Number | Name | Date |
|---|---|---|
| 413,438 | Eggers | Oct. 22, 1889 |
| 680,848 | Erny | Aug. 20, 1901 |
| 1,174,798 | Apple | Mar. 7, 1916 |
| 2,307,627 | Lawson | Jan. 5, 1943 |